United States Patent
Ram (10) Patent No.: US 11,035,585 B2
(45) Date of Patent: Jun. 15, 2021

(54) DEHUMIDIFICATION CONTROL AT PART LOAD

(71) Applicant: CARRIER CORPORATION, Palm Beach Gardens, FL (US)

(72) Inventor: Mani Ram, Haryana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 15 days.

(21) Appl. No.: 16/392,321

(22) Filed: Apr. 23, 2019

(65) Prior Publication Data

US 2019/0368766 A1 Dec. 5, 2019

(30) Foreign Application Priority Data

May 31, 2018 (IN) .............................. 201811020423

(51) Int. Cl.
| | |
|---|---|
| *F24F 3/14* | (2006.01) |
| *F24F 11/86* | (2018.01) |
| *F24F 11/76* | (2018.01) |
| *F24F 11/77* | (2018.01) |
| *F24F 11/81* | (2018.01) |
| F24F 110/20 | (2018.01) |
| F24F 13/22 | (2006.01) |
| F24F 110/10 | (2018.01) |

(52) U.S. Cl.
CPC .............. *F24F 11/86* (2018.01); *F24F 11/76* (2018.01); *F24F 11/77* (2018.01); *F24F 11/81* (2018.01); *F24F 2013/221* (2013.01); *F24F 2110/10* (2018.01); *F24F 2110/20* (2018.01)

(58) Field of Classification Search
CPC .. F24F 11/86; F24F 11/77; F24F 11/76; F24F 2110/20; F24F 2110/10; F24F 2013/221
USPC ........................................................ 165/230
See application file for complete search history.

(56) References Cited

U.S. PATENT DOCUMENTS

| | | | |
|---|---|---|---|
| 3,547,348 | A | 12/1970 | Kruper |
| 4,813,474 | A | 3/1989 | Umezu |
| 5,345,776 | A | 9/1994 | Komazaki et al. |
| 5,915,473 | A | 6/1999 | Ganesh et al. |
| 6,311,511 | B1 | 11/2001 | Maeda |
| 6,427,454 | B1 | 8/2002 | West |
| 9,500,379 | B2 | 11/2016 | Schnell et al. |
| 9,562,700 | B2 * | 2/2017 | Watanabe ............... F24F 3/153 |
| 9,874,365 | B2 | 1/2018 | Fujita et al. |

(Continued)

FOREIGN PATENT DOCUMENTS

| | | |
|---|---|---|
| CN | 101737897 B | 8/2012 |
| CN | 105928065 A | 9/2016 |

(Continued)

*Primary Examiner* — Davis D Hwu
(74) *Attorney, Agent, or Firm* — Cantor Colburn LLP (57) ABSTRACT

A heating, ventilation and air-conditioning (HVAC) system is provided. The HVAC system includes indoor and outdoor units to condition air of a space, an indoor heat exchanger by which the indoor and outdoor units thermally interact, temperature sensors operably disposed at least at the indoor heat exchanger and in the space and a controller operably coupled to the indoor and outdoor units and configured to control operations of the indoor and outdoor units in accordance with readings of the temperature sensors by reference to space-dew point temperature relationship tables.

19 Claims, 5 Drawing Sheets

(56) References Cited

U.S. PATENT DOCUMENTS

| | | | |
|---|---|---|---|
| 2004/0108388 A1* | 6/2004 | Wacker | F24F 3/153 236/44 C |
| 2008/0173035 A1* | 7/2008 | Thayer | F24F 3/153 62/173 |
| 2008/0307803 A1 | 12/2008 | Herzon | |
| 2009/0277197 A1* | 11/2009 | Gambiana | F25B 39/028 62/115 |
| 2010/0242507 A1 | 9/2010 | Meckler | |
| 2010/0269521 A1 | 10/2010 | Moore | |
| 2016/0178222 A1 | 6/2016 | Bush | |

FOREIGN PATENT DOCUMENTS

| | | |
|---|---|---|
| CN | 104374037 B | 2/2017 |
| CN | 206637755 U | 11/2017 |
| CN | 206670111 U | 11/2017 |
| CN | 207132480 U | 3/2018 |
| EP | 0427486 B1 | 1/1995 |
| EP | 1443278 B1 | 8/2004 |
| EP | 2767772 B1 | 3/2018 |
| WO | 17003383 A1 | 1/2017 |

* cited by examiner

FIG. 6

DEHUMIDIFICATION CONTROL AT PART LOAD

CROSS-REFERENCE TO RELATED APPLICATIONS

This application claims the benefit of Indian Patent Application No. 201811020423 which was filed on May 31, 2018. The entire contents of Indian Patent Application No. 201811020423 are incorporated herein by reference.

BACKGROUND

The following description relates to ducted split inverter systems and, more specifically, to dehumidification control at part load in ducted split inverter system which has a variable speed fan motor in an indoor unit.

Ducted split inverter systems are often installed in a space where humidity levels can be high. In such cases, whenever a required cooling capacity for the space decreases, these ducted split inverter systems tend to run at part load conditions where their compressors run at lower speeds as compared to their rated speeds. In addition, in these cases, sensible heat factors increase and therefore relative humidity inside the spaces correspondingly increases and leads to uncomfortable conditions. This is especially true when the compressors run at minimum speeds, since the ducted split inverter systems are thus effectively unable to remove relative humidity (RH %) from the spaces.

As alluded to above, the most immediate effect of the issues with the ducted split inverter systems is human personal discomfort. Additional effects are that the resulting high humidity environments promote the growth of microscopic organisms.

BRIEF DESCRIPTION

According to an aspect of the disclosure, a heating, ventilation and air-conditioning (HVAC) system is provided. The HVAC system includes indoor and outdoor units to condition air of a space, a heat exchanger by which the indoor and outdoor units thermally interact, temperature sensors operably disposed at least at the heat exchanger and in the space and a controller operably coupled to the indoor and outdoor units and configured to control operations of the indoor and outdoor units in accordance with readings of the temperature sensors by reference to space-dew point temperature relationship tables.

In accordance with additional or alternative embodiments, the temperature sensor at the heat exchanger is operably disposed at a midlet of the heat exchanger and the HVAC system further includes additional temperature sensors at an inlet and an outlet of the heat exchanger.

In accordance with additional or alternative embodiments, the HVAC system further includes a duct through which the indoor unit cycles the air into and from the space.

In accordance with additional or alternative embodiments, the space is defined within a structure as multiple spaces and the duct includes multiple ducts fluidly communicative with each of the multiple spaces, respectively.

In accordance with additional or alternative embodiments, the controller controls operations of the indoor and outdoor units to reduce relative humidity in the space when the temperature sensors indicate that a temperature at the heat exchanger is greater than a dew point temperature of the space as recorded in the space-dew point temperature relationship tables.

In accordance with additional or alternative embodiments, the indoor unit includes a first blower, the outdoor unit includes a compressor, an expansion valve and a second blower and the controller is configured to control at least one of a speed of the first blower, a speed of the compressor, an opening and closing condition of the expansion valve and a speed of the second blower.

In accordance with additional or alternative embodiments, the controller is configured to control the speed of the compressor as a primary initiative, the opening and closing condition of the expansion valve as a secondary initiative, the speed of the first blower as a tertiary initiative and the speed of the second blower as a quaternary initiative.

In accordance with additional or alternative embodiments, in an event the temperature sensors indicate that the temperature at the heat exchanger is greater than the dew point temperature of the space, the controller is configured to control the speed of the compressor as a primary initiative to reduce the temperature at the heat exchanger, control the opening and closing condition of the expansion valve as a secondary initiative to reduce the temperature at the heat exchanger, control the speed of the first blower as a tertiary initiative to reduce the temperature at the heat exchanger and control the speed of the second blower as a quaternary initiative to reduce the temperature at the heat exchanger.

According to an aspect of the disclosure, a ducted split inverter heating, ventilation and air-conditioning (HVAC) system is provided and includes an indoor unit configured to cycle air into and from a space, an outdoor unit configured to reject heat removed from the air cycled by the indoor unit from refrigerant to thereby cool the refrigerant, a heat exchanger by which the refrigerant, having been cooled, thermally interacts with the air cycled by the indoor unit to thereby cool the air as the air is cycled, temperature sensors and a controller. The temperature sensors are operably disposed at least at a midlet of the heat exchanger and in the space. The controller is operably coupled to the indoor and outdoor units and configured to control operations of the indoor and outdoor units in accordance with readings of the temperature sensors by reference to space-dew point temperature relationship tables.

In accordance with additional or alternative embodiments, the ducted split inverter HVAC system further includes additional temperature sensors at an inlet and an outlet of the heat exchanger.

In accordance with additional or alternative embodiments, the ducted split inverter HVAC system further includes a duct through which the indoor unit cycles the air into and from the space.

In accordance with additional or alternative embodiments, the space is defined within a structure as multiple spaces and the duct includes multiple ducts fluidly communicative with each of the multiple spaces, respectively.

In accordance with additional or alternative embodiments, the controller controls operations of the indoor and outdoor units to reduce relative humidity in the space when the temperature sensors indicate that a midlet temperature is greater than a dew point temperature of the space.

In accordance with additional or alternative embodiments, the indoor unit includes a first blower, the outdoor unit includes a compressor, an expansion valve and a second blower and the controller is configured to control at least one of a speed of the first blower, a speed of the compressor, an opening and closing condition of the expansion valve and a speed of the second blower.

In accordance with additional or alternative embodiments, the controller is configured to control the speed of the compressor as a primary initiative, the opening and closing condition of the expansion valve as a secondary initiative, the speed of the first blower as a tertiary initiative and the speed of the second blower as a quaternary initiative.

In accordance with additional or alternative embodiments, in an event the temperature sensors indicate that the midlet temperature is greater than the dew point temperature of the space, the controller is configured to control the speed of the compressor as a primary initiative to reduce the midlet temperature, control the opening and closing condition of the expansion valve as a secondary initiative to reduce the midlet temperature, control the speed of the first blower as a tertiary initiative to reduce the midlet temperature and control the speed of the second blower as a quaternary initiative to reduce the midlet temperature.

According to an aspect of the disclosure, a method of operating a ducted split inverter heating, ventilation and air-conditioning (HVAC) system is provided. The ducted split inverter HVAC system includes indoor and outdoor units configured to condition air of a space and a heat exchanger by which the indoor and outdoor units thermally interact. The method includes sensing temperatures at least at a midlet of the heat exchanger and in the space, determining whether the temperature at the midlet is greater than a dew-point temperature of the space by reference to space-dew point temperature relationship tables and controlling operations of the indoor and outdoor units to reduce the temperature at the midlet in an event the determining indicates that the temperature at the midlet is greater than the dew-point temperature of the space.

In accordance with additional or alternative embodiments, the indoor unit includes a first blower, the outdoor unit includes a compressor, an expansion valve and a second blower and the controlling includes controlling at least one of a speed of the first blower, controlling a speed of the compressor, controlling an opening and closing condition of the expansion valve and controlling a speed of the second blower.

In accordance with additional or alternative embodiments, the controlling includes controlling the speed of the compressor as a primary initiative, controlling the opening and closing condition of the expansion valve as a secondary initiative, controlling the speed of the first blower as a tertiary initiative and controlling the speed of the second blower as a quaternary initiative.

In accordance with additional or alternative embodiments, in an event the determining indicates that the temperature at the midlet is greater than the dew-point temperature of the space, the controlling includes controlling the speed of the compressor as a primary initiative to reduce the midlet temperature, re-determining whether the temperature at the midlet is greater than the dew-point temperature of the space by reference to the space-dew point temperature relationship tables, controlling the opening and closing condition of the expansion valve as a secondary initiative to reduce the midlet temperature in an event the re-determining indicates that the temperature at the midlet remains greater than the dew-point temperature of the space, re-re-determining whether the temperature at the midlet is greater than the dew-point temperature of the space by reference to the space-dew point temperature relationship tables, controlling the speed of the first blower as a tertiary initiative to reduce the midlet temperature in an event the re-re-determining indicates that the temperature at the midlet remains greater than the dew-point temperature of the space, re-re-re-determining whether the temperature at the midlet is greater than the dew-point temperature of the space by reference to the space-dew point temperature relationship tables and controlling the speed of the second blower as a quaternary initiative to reduce the midlet temperature in an event the re-re-re-determining indicates that the temperature at the midlet remains greater than the dew-point temperature of the space.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, a ducted split inverter heating, ventilation and air conditioning (HVAC) system is provided and includes an indoor heat exchanger with at least three temperature sensors at an inlet thereof, a midlet thereof and an outlet thereof along with at least one room temperature sensor. Based on the room temperature, as read by the room temperature sensor, and a dew point temperature relationship, the ducted split inverter HVAC system determines whether relative humidity is in a comfortable zone or not from predefined tables and readings of the temperature sensors at the inlet, the midlet and the outlet and takes corrective action based on its findings.

Figure 1:
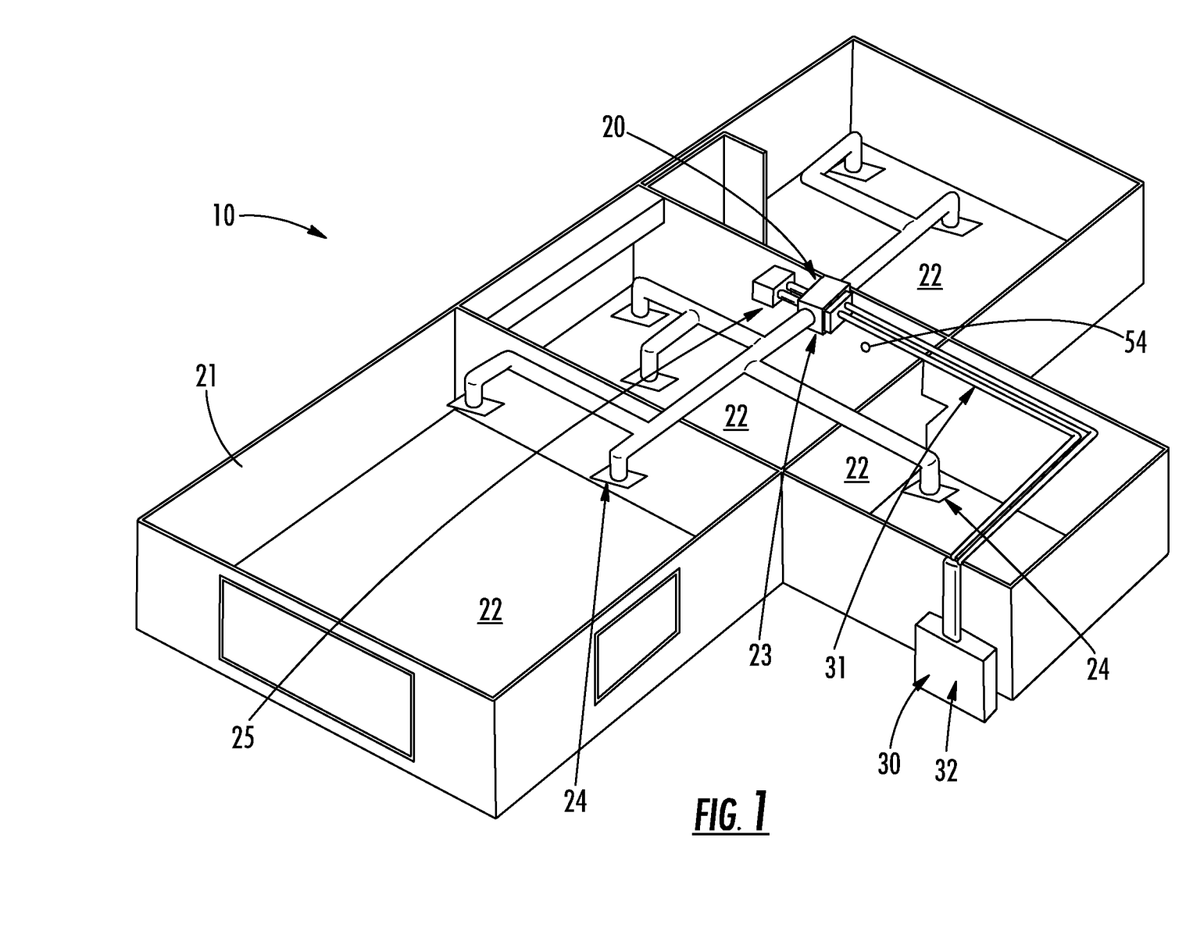
FIG. 1 is a perspective view of a ducted split inverter heating, ventilation and air-conditioning (HVAC) system in accordance with embodiments.
Figure 2:
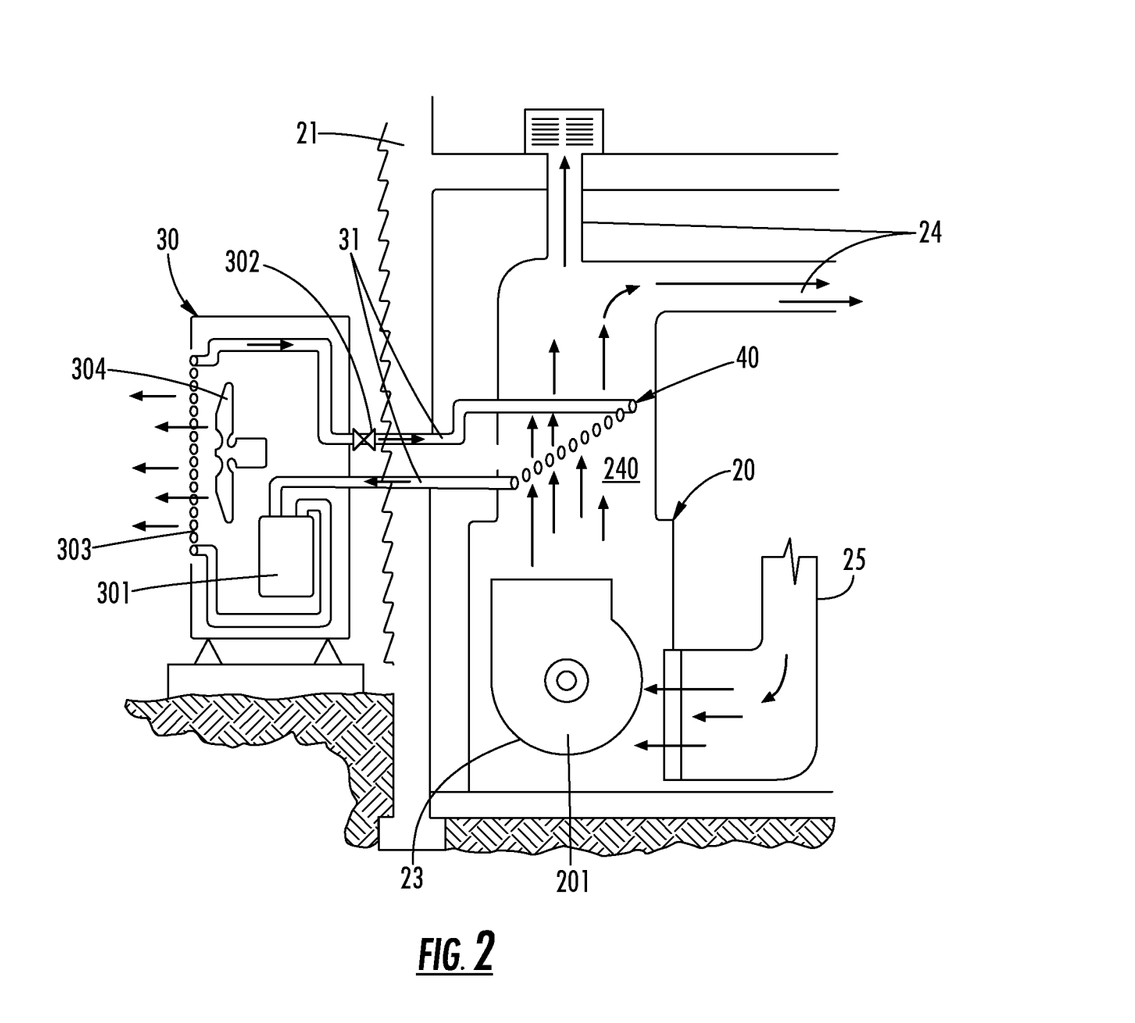
FIG. 2 is a schematic diagram of components of the ducted split inverter HVAC system of FIG. 1.

With reference to FIGS. 1 and 2, a ducted split inverter HVAC system (hereinafter referred to as an "HVAC system") 10 is provided. The HVAC system 10 includes an indoor unit 20, an outdoor unit 30 and a heat exchanger 40.

The indoor unit 20 is deployable within a structure, such as a building 21 that is constructed with one or more rooms 22, and includes a central, air cycling component 23, one or more ducts 24 and a return air duct 25. The one or more ducts 24 extend from the central, air cycling component 23 to each of the one or more rooms 22. The return air duct 25 extends from the one or more rooms 22 to the central, air cycling component 23. During operations of the HVAC system 10, the air cycling component 23, which is configured to cycle air into and from space of the one or more rooms 22, draws air (i.e., heated air) in through the return air duct 25 and drives the air outwardly to the one or more rooms 22 through the one or more ducts 24 for cooling purposes. The outdoor unit 30 is coupled to the indoor unit 20 by way of refrigerant pipes 31 and includes an outdoor component 32 that is disposed at an exterior of the building 21.

As shown in FIG. 2, the indoor unit 20 includes a first blower 201 that draws the air through the return air duct 25 and drives the air outwardly through the one or more ducts 24. The outdoor unit 30 includes a compressor 301 that compresses refrigerant received from the heat exchanger 40 via an outgoing one of the refrigerant pipes 31, an expansion valve 302 that expands the refrigerant, an evaporator 303, which is receptive of refrigerant from the expansion valve 302, and a second blower 304. The second blower 304 blows external air over the evaporator 303 to reject heat, which is removed from the air cycled by the indoor unit 20, from the refrigerant to thereby cool the refrigerant, which is delivered back toward the heat exchanger 40 via another one of the refrigerant pipes 31.

Figure 3:
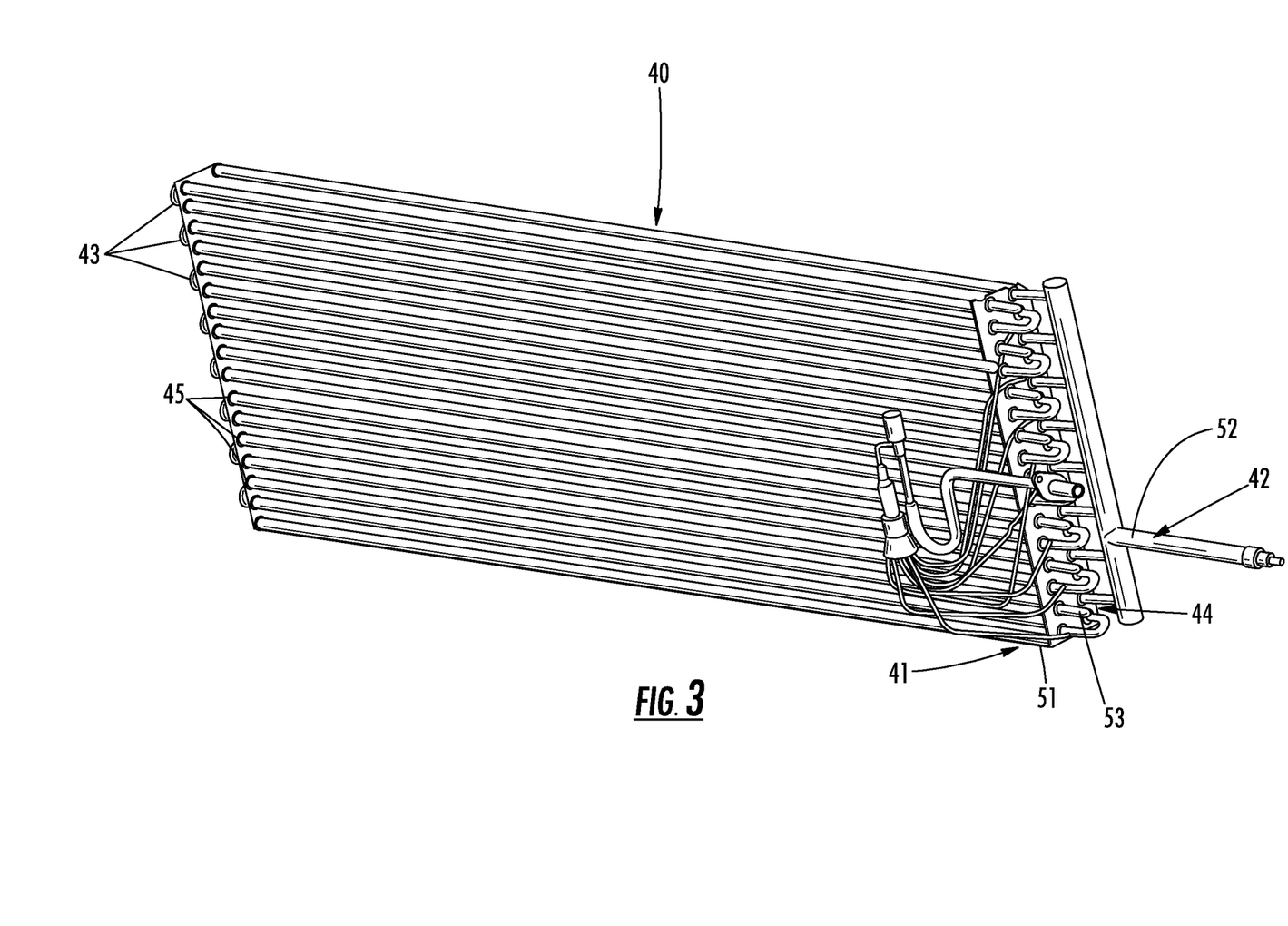
FIG. 3 is a perspective illustration of a heat exchanger of the ducted split inverter HVAC system of FIG. 2 in accordance with embodiments.

As shown in FIG. 2 and with additional reference to FIG. 3, the heat exchanger 40 may be disposed within a primary section 240 of the one or more ducts 24 proximate to the first blower 201 and includes an inlet 41 and an outlet 42, which are coupled to the refrigerant pipes 31, tubing 43 extending between the inlet and the outlet 42, a midlet 44, which is defined along the tubing 43 between the inlet 41 and the outlet 42 and fins 45. Cooled refrigerant received from the outdoor unit 30 flows through the tubing 43 from the inlet 41, to the midlet 44 and then to the outlet 42 and thermally interacts with (i.e., removes heat from) air, which is cycled by the indoor unit 20 and which passes over the fins 45 as it moves through the primary section 240, such that the air subsequently flows through the one or more ducts 24 as cooled air.

As shown in FIG. 3, the HVAC system 10 further includes a first temperature sensor 51 at the inlet 41, a second temperature sensor 52 at the outlet 42, a third temperature sensor 53 at the midlet 44 and a fourth temperature sensor 54 (see FIG. 1) in the space of one or more of the rooms 22. The first temperature sensor 51 senses coil temperatures at or around the inlet 41, the second temperature sensor 52 senses coil temperatures at or around the outlet 42, the third temperature sensor 53 senses coil temperatures at or around the midlet 44 and the fourth temperature sensor 54 senses fluid and/or air temperatures in or around the space of one or more of the rooms 22.

Figure 4:
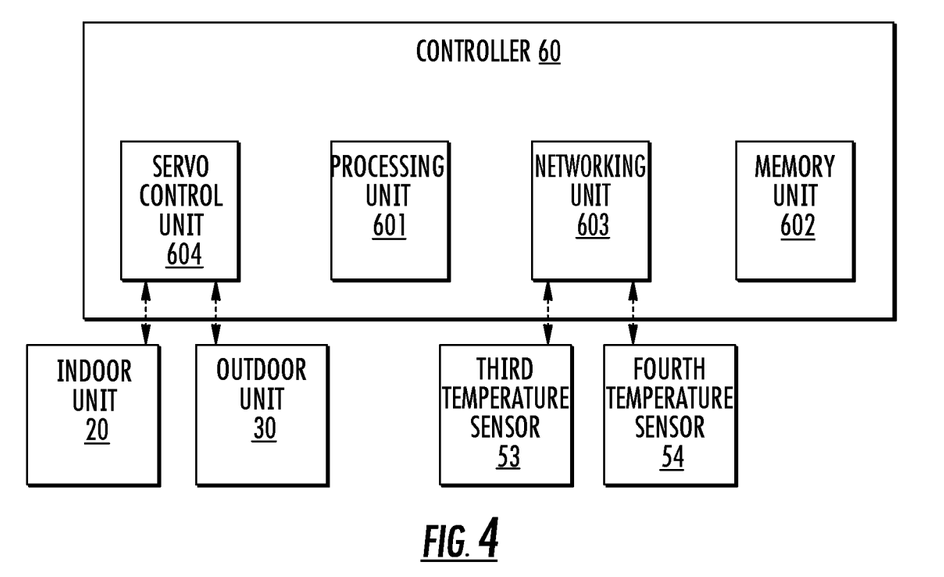
FIG. 4 is a schematic diagram of an HVAC system controller in accordance with embodiments.

With reference to FIG. 4, the HVAC system 10 further includes a controller 60. The controller 60 is operably coupled to the indoor and outdoor units 20 and 30 and is configured to control operations of the indoor and outdoor units 20 and 30 in accordance with readings of at least the third and fourth temperature sensors 53 and 54 by reference to the following space-dew point temperature relationship tables. As shown in FIG. 4, the controller 60 includes a processing unit 601, a memory unit 602, a networking unit 603 by which the processing unit 601 is communicative with at least the third and fourth temperature sensors 53 and 54, and a servo control unit 604. The memory unit 602 has the following space-dew point temperature relationship tables stored thereon along with executable instructions that are readable and executable by the processing unit 601. When the executable instructions are read and executed by the processing unit 601, the executable instructions cause the processing unit 601 to determine whether the space of the one or more rooms 22 is uncomfortable or not, according to the non-limiting Tables 1 and 2 shown below, to then judge whether it is possible to take action to address the space being uncomfortable and then to execute the taking of that action.

TABLE 1

| Uncomfortable Relative humidity percentage: 60% | | | | | | | | | | | | | |
|---|---|---|---|---|---|---|---|---|---|---|---|---|---|
| | Room temperature (° C.) | | | | | | | | | | | | |
| | 18 | 19 | 20 | 21 | 22 | 23 | 24 | 25 | 26 | 27 | 28 | 29 | 30 |
| Dew point temperature (° C.) | 10.2 | 11.1 | 12.0 | 13.0 | 13.9 | 14.9 | 15.8 | 16.7 | 17.7 | 18.6 | 19.5 | 20.5 | 21.4 |

TABLE 2

| Comfortable Relative humidity percentage: 50% | | | | | | | | | | | | | |
|---|---|---|---|---|---|---|---|---|---|---|---|---|---|
| | Room temperature (° C.) | | | | | | | | | | | | |
| | 18 | 19 | 20 | 21 | 22 | 23 | 24 | 25 | 26 | 27 | 28 | 29 | 30 |
| Dew point temperature (° C.) | 7.5 | 8.4 | 9.3 | 10.2 | 11.1 | 12 | 13.0 | 13.9 | 14.8 | 15.7 | 16.6 | 17.6 | 18.5 |

That is, when the executable instructions are read and executed by the processing unit 601, the executable instructions cause the processing unit 601 to determine a coil temperature at the midlet 44 of the heat exchanger 40 and to determine a temperature in the space of the room 22 from readings of the third and fourth temperature sensors 53 and 54, respectively, via the networking unit 603 and to determine whether the coil temperature at the midlet 44 is higher or lower than a dew point temperature of the room 22 by reference to Tables 1 and 2 in the memory unit 602. At this point, in an event the coil temperature at the midlet 44 is determined to be higher than a dew point temperature of the room 22 by reference to the Tables 1 and 2 in the memory unit 602, the executable instructions cause the processing unit 601 to judge whether it is possible to take action to address the space being uncomfortable and then to execute the taking of that action.

In accordance with embodiments, in an event a coil temperature at the midlet 44 is higher than the dew point temperature at a given room temperature, the situation is representative of a relative humidity percentage being in an uncomfortable zone (Table 1). Here, if a room temperature is 25° C. (77° F.) and the coil temperature at the midlet 44 is greater than or equal to 16.7° C. (62.06° F.), the HVAC system 10 may be judged as being unable to reduce a relative humidity percentage to lower than 60%. However when the room temperature is 25° C. (77° F.) and the coil temperature at the midlet 44 is less than or equal to 13.9° C. (57.02° F.), the HVAC system 10 may be judged as being able to reduce the relative humidity percentage to lower than 50% by effectively lowering the coil temperature at the midlet 44 to be lower than the dew point temperature of room (Table 2).

To achieve a condition at which the coil temperature of the midlet 44 is lower than the dew point temperature, the processing unit 601 can instruct the servo control unit 604 to vary a speed of the compressor 301, to control an opening and closing condition of the expansion valve 302, to control a speed of the first blower 201 and to control a speed of the second blower 304. In accordance with further embodiments, to achieve the condition at which the coil temperature of the midlet 44 is lower than the dew point temperature, the processing unit 601 can instruct the servo control unit 604 to vary the speed of the compressor 301 as a primary initiative, to control the opening and closing condition of the expansion valve 302 as a secondary initiative, to control the speed of the first blower 201 as a tertiary initiative and to control the speed of the second blower 304 as a quaternary initiative.

Figure 5:
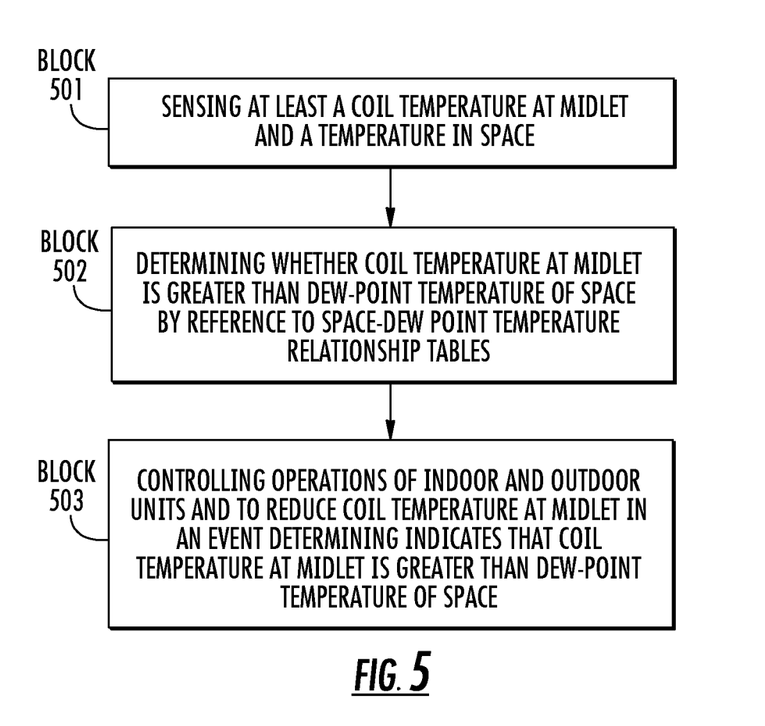
FIG. 5 is a flow diagram of a method of operating an HVAC system in accordance with embodiments.

With reference to FIG. 5, a method of operating the HVAC system 10 is provided. As shown in FIG. 5, the method includes sensing at least a coil temperature at the midlet 44 and a temperature in the space (block 501), determining whether the coil temperature at the midlet 44 is greater than a dew-point temperature of the space by reference to the space-dew point temperature relationship tables (block 502) and controlling operations of the indoor and outdoor units 20 and 30 to reduce the coil temperature at the midlet 44 in an event the determining indicates that the coil temperature at the midlet 44 is greater than the dew-point temperature of the space (block 503).

In accordance with embodiments, the controlling of block 503 may include any one or more of controlling the speed of the compressor 301 as a primary (or other) initiative, controlling the opening and closing condition of the expansion valve 302 as a secondary (or other) initiative, controlling the speed of the first blower 201 as a tertiary (or other) initiative and controlling the speed of the second blower 304 as a quaternary (or other) initiative in any one or more combinations thereof.

Figure 6:
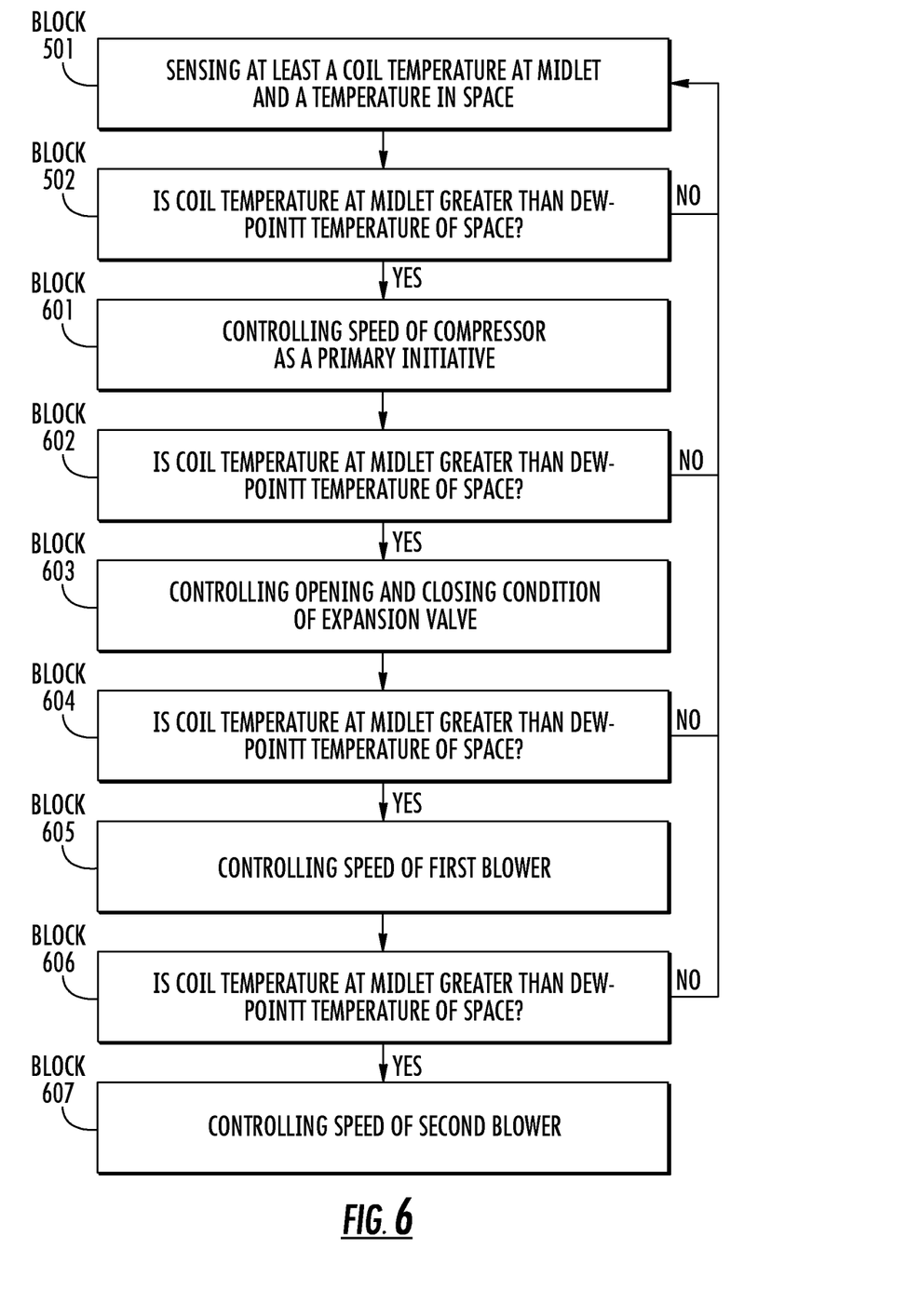
FIG. 6 is a flow diagram of a method of operating an HVAC system in accordance with further embodiments.

With reference to FIG. 6 and, in accordance with further embodiments, in an event the determining of block 502 indicates that the temperature at the midlet 44 is greater than the dew-point temperature of the space, the controlling of block 503 of FIG. 5 may include controlling the speed of the compressor 301 as a primary initiative to reduce the coil temperature at the midlet 44 (block 601) and then secondarily determining whether the coil temperature at the midlet 44 is greater than the dew-point temperature of the space by reference to the space-dew point temperature relationship tables (block 602). At this point, in an event the secondary determining of block 602 indicates that the coil temperature at the midlet 44 remains greater than the dew-point temperature of the space, the method may further include controlling the opening and closing condition of the expansion valve 302 as a secondary initiative to reduce the coil temperature at the midlet 44 (block 603) and then tertiarily determining whether the coil temperature at the midlet 44 is greater than the dew-point temperature of the space by reference to the space-dew point temperature relationship tables (block 604). At this point, in an event the tertiary determining of block 604 indicates that the coil temperature at the midlet 44 remains greater than the dew-point temperature of the space, the method may further include controlling the speed of the first blower 201 as a tertiary initiative to reduce the coil temperature at the midlet 44 (block 605) and quaternarily determining whether the coil temperature at the midlet 44 is greater than the dew-point temperature of the space by reference to the space-dew point temperature relationship tables (block 606). At this point, in an event the quaternary determining of block 606 indicates that the coil temperature at the midlet 444 remains greater than the dew-point temperature of the space, the method may further include controlling the speed of the second blower 304 as a quaternary initiative to reduce the coil temperature at the midlet 44 (block 607).

Technical effects and benefits of the present disclosure are improved dehumidification and comfort and an ability to set a desired relative humidity for a room 22 without extra equipment while remaining cost effective.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A heating, ventilation and air-conditioning (HVAC) system, comprising:
    indoor and outdoor units to condition air of a space;
    an indoor heat exchanger by which the indoor and outdoor units thermally interact;
    temperature sensors operably disposed at the indoor heat exchanger and in the space; and
    a controller operably coupled to the indoor and outdoor units and configured to control operations of the indoor and outdoor units in accordance with readings of the temperature sensors by reference to space-dew point temperature relationship tables,
    wherein the temperature sensor at the indoor heat exchanger is operably disposed at a midlet of the indoor heat exchanger and the controller controls indoor and outdoor unit operations to reduce a temperature of the midlet of the indoor heat exchanger in an event the temperature of the midlet of the indoor heat exchanger exceeds a dew-point temperature determined by the reference to the space-dew point temperature relationship tables.

2. The HVAC system according to claim 1, wherein the HVAC system further comprises additional temperature sensors at an inlet and an outlet of the indoor heat exchanger.

3. The HVAC system according to claim 1, further comprising a duct through which the indoor unit cycles the air into and from the space.

4. The HVAC system according to claim 3, wherein the space is defined within a structure as multiple spaces and the duct comprises multiple ducts fluidly communicative with each of the multiple spaces, respectively.

5. The HVAC system according to claim 1, wherein the controller controls operations of the indoor and outdoor units to reduce relative humidity in the space when the temperature sensors indicate that a temperature at the indoor heat exchanger is greater than a dew point temperature of the space as recorded in the space-dew point temperature relationship tables.

6. The HVAC system according to claim 5, wherein:
the indoor unit comprises a first blower,
the outdoor unit comprises a compressor, an expansion valve and a second blower, and
the controller is configured to control at least one of a speed of the first blower, a speed of the compressor, an opening and closing condition of the expansion valve and a speed of the second blower.

7. The HVAC system according to claim 6, wherein the controller is configured to control the speed of the compressor as a primary initiative, the opening and closing condition of the expansion valve as a secondary initiative, the speed of the first blower as a tertiary initiative and the speed of the second blower as a quaternary initiative.

8. The HVAC system according to claim 6, wherein, in an event the temperature sensors indicate that the temperature at the heat exchanger is greater than the dew point temperature of the space, the controller is configured to:
control the speed of the compressor as a primary initiative to reduce the temperature at the heat exchanger,
control the opening and closing condition of the expansion valve as a secondary initiative to reduce the temperature at the heat exchanger,
control the speed of the first blower as a tertiary initiative to reduce the temperature at the heat exchanger, and
control the speed of the second blower as a quaternary initiative to reduce the temperature at the heat exchanger.

9. A ducted split inverter heating, ventilation and air-conditioning (HVAC) system, comprising:
an indoor unit configured to cycle air into and from a space;
an outdoor unit configured to reject heat removed from the air cycled by the indoor unit from refrigerant to thereby cool the refrigerant;
an indoor heat exchanger by which the refrigerant, having been cooled, thermally interacts with the air cycled by the indoor unit to thereby cool the air as the air is cycled, the indoor heat exchanger comprising tubing through which the refrigerant flows from an inlet to a midlet and then to an outlet;
temperature sensors operably disposed at the midlet of the indoor heat exchanger and in the space to sense respective temperatures of the midlet of the indoor heat exchanger and in the space; and
a controller to determine, from the temperature in the space, a dew-point temperature thereof by reference to space-dew point temperature relationship tables and to control indoor and outdoor unit operations to reduce the temperature of the midlet of the indoor heat exchanger in an event the temperature of the midlet of the indoor heat exchanger exceeds the dew-point temperature.

10. The ducted split inverter HVAC system according to claim 9, further comprising additional temperature sensors at an inlet and an outlet of the heat exchanger.

11. The ducted split inverter HVAC system according to claim 9, further comprising a duct through which the indoor unit cycles the air into and from the space.

12. The ducted split inverter HVAC system according to claim 11, wherein the space is defined within a structure as multiple spaces and the duct comprises multiple ducts fluidly communicative with each of the multiple spaces, respectively.

13. The ducted split inverter HVAC system according to claim 9, wherein the controller controls operations of the indoor and outdoor units to reduce relative humidity in the space when the temperature sensors indicate that a midlet temperature is greater than a dew point temperature of the space.

14. The ducted split inverter HVAC system according to claim 13, wherein:
the indoor unit comprises a first blower,
the outdoor unit comprises a compressor, an expansion valve and a second blower, and
the controller is configured to control at least one of a speed of the first blower, a speed of the compressor, an opening and closing condition of the expansion valve and a speed of the second blower.

15. The ducted split inverter HVAC system according to claim 14, wherein the controller is configured to control the speed of the compressor as a primary initiative, the opening and closing condition of the expansion valve as a secondary initiative, the speed of the first blower as a tertiary initiative and the speed of the second blower as a quaternary initiative.

16. The ducted split inverter HVAC system according to claim 14, wherein, in an event the temperature sensors indicate that the midlet temperature is greater than the dew point temperature of the space, the controller is configured to:
control the speed of the compressor as a primary initiative to reduce the midlet temperature,
control the opening and closing condition of the expansion valve as a secondary initiative to reduce the midlet temperature,
control the speed of the first blower as a tertiary initiative to reduce the midlet temperature, and
control the speed of the second blower as a quaternary initiative to reduce the midlet temperature.

17. A method of operating a ducted split inverter heating, ventilation and air-conditioning (HVAC) system comprising indoor and outdoor units configured to condition air of a space and an indoor heat exchanger by which the indoor and outdoor units thermally interact, the method comprising:
sensing temperatures at least at a midlet of the indoor heat exchanger and in the space;
determining whether the temperature at the midlet is greater than a dew-point temperature of the space by reference to space-dew point temperature relationship tables; and
controlling operations of the indoor and outdoor units to reduce the temperature at the midlet in an event the determining indicates that the temperature at the midlet is greater than the dew-point temperature of the space.

18. The method according to claim 17, wherein:
the indoor unit comprises a first blower,
the outdoor unit comprises a compressor, an expansion valve and a second blower, and
the controlling comprises controlling at least one of a speed of the first blower, controlling a speed of the compressor, controlling an opening and closing condition of the expansion valve and controlling a speed of the second blower.

19. The method according to claim 18, wherein the controlling comprises:
controlling the speed of the compressor as a primary initiative;
controlling the opening and closing condition of the expansion valve as a secondary initiative;
controlling the speed of the first blower as a tertiary initiative; and
controlling the speed of the second blower as a quaternary initiative.

\* \* \* \* \*